(12) United States Patent
Mitra et al.

(10) Patent No.: US 10,223,231 B1
(45) Date of Patent: Mar. 5, 2019

(54) DATA STORAGE MANAGEMENT

(71) Applicant: Seagate Technology LLC, Cupertino, CA (US)

(72) Inventors: Sumanranjan Mitra, Mumbai (IN); Kantanu Kumar Mohapatra, Bhubaneswar (IN); Nilesh Kumar Singh, Muniguda (IN)

(73) Assignee: Seagate Technology LLC, Cupertino, CA (US)

( * ) Notice: Subject to any disclaimer, the term of this patent is extended or adjusted under 35 U.S.C. 154(b) by 80 days.

(21) Appl. No.: 15/672,889

(22) Filed: Aug. 9, 2017

(51) Int. Cl.
| | |
|---|---|
| *G06F 11/00* | (2006.01) |
| *G06F 11/30* | (2006.01) |
| *H04L 29/08* | (2006.01) |
| *G06F 11/07* | (2006.01) |
| *H04L 12/26* | (2006.01) |
| *H04L 12/24* | (2006.01) |

(52) U.S. Cl.
CPC ...... *G06F 11/3034* (2013.01); *G06F 11/0709* (2013.01); *H04L 43/0817* (2013.01); *H04L 67/322* (2013.01); H04L 41/5009 (2013.01); H04L 67/1097 (2013.01)

(58) Field of Classification Search
CPC ........ G06F 11/02; G06F 11/004; G06F 11/07; G06F 11/22; G06F 11/1032; G06F 11/1036
USPC .................................................. 714/1, 2, 25
See application file for complete search history.

(56) References Cited

U.S. PATENT DOCUMENTS

| | | | |
|---|---|---|---|
| 7,558,850 B2 | 7/2009 | Chambliss et al. | |
| 7,636,801 B1 | 12/2009 | Kekre et al. | |
| 7,899,793 B2 | 3/2011 | Mimatsu | |
| 8,320,927 B2 | 11/2012 | Aaron et al. | |
| 9,367,262 B2 | 6/2016 | Goss et al. | |
| 2014/0006690 A1 | 1/2014 | Shin et al. | |
| 2014/0281819 A1* | 9/2014 | Wood | G11C 16/349 714/773 |
| 2014/0297941 A1* | 10/2014 | Rajani | G06F 3/0644 711/114 |
| 2014/0337666 A1* | 11/2014 | Resch | G06F 11/1004 714/6.22 |
| 2015/0046664 A1 | 2/2015 | Fitzpatrick et al. | |
| 2015/0113326 A1* | 4/2015 | Talagala | G06F 11/1441 714/24 |
| 2015/0193309 A1* | 7/2015 | Khadiwala | G06F 11/1435 714/4.11 |
| 2015/0220400 A1* | 8/2015 | Resch | G06F 11/1464 714/6.2 |
| 2016/0259742 A1* | 9/2016 | Faulkner | G06F 3/0653 |
| 2017/0339622 A1* | 11/2017 | Condeixa | H04L 41/0893 |
| 2018/0270165 A1* | 9/2018 | Chen | H04L 47/822 |

* cited by examiner

*Primary Examiner* — Sarai E Butler
(74) *Attorney, Agent, or Firm* — Mueting, Raasch & Gebhardt, P.A.

(57) ABSTRACT

Exemplary systems, apparatus, and methods may write data to data blocks defining health levels corresponding to the quality-of-service levels of the data. Further, when health levels of the data blocks change over time, the data may be moved in an attempt to maintain the data in data blocks defining health levels that correspond to the quality-of-service levels of the data.

20 Claims, 6 Drawing Sheets

DATA STORAGE MANAGEMENT

The disclosure herein relates to the data storage management, and further to systems and devices for performing and implementing such data storage management.

SUMMARY

One exemplary apparatus may include a plurality of data storage drives, each data storage drive comprising a plurality of data blocks, and a controller comprising one or more processors. The controller may be operably coupled to the plurality of data storage drives and configured to: maintain health information for the plurality of data storage drives. The health information may include a number of available data blocks at each health level of a plurality of health levels for each data storage drive. The controller may be further configured to receive write data to be written to the plurality of data storage drives, determine a quality-of-service (QOS) level for the write data, and select one or more data storage drives for the write data to be written to based on the health information and the QOS level for the write data.

One exemplary system may include a plurality of data storage drives, each data storage drive comprising a plurality of data blocks, and a controller comprising one or more processors. The controller may be operably coupled to the plurality of data storage drives and configured to maintain health information for the plurality of data storage drives. The health information may include a number of available data blocks at each health level of a plurality of health levels for each data storage drive. The controller may be further configured to maintain data on the plurality of data blocks of the plurality of data storage drives defining a health level corresponding to a quality-of-service (QOS) level of the data.

One exemplary system may include a plurality of data storage drives, each data storage drive comprising a plurality of data blocks, and a controller comprising one or more processors. The controller may be operably coupled to the plurality of data storage drives and may be configured to maintain a plurality of pools. Each pool may include at least one data storage drive of the plurality of data storage drives, and maintain health information for each of the plurality of data storage drives. The health information may include a number of available data blocks at each health level of a plurality of health levels for each data storage drive. The controller may be further configured to assign a different threshold value for each pool, the threshold value representing a percentage of data blocks per data storage drive defining a selected health level allowed within the corresponding pool.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
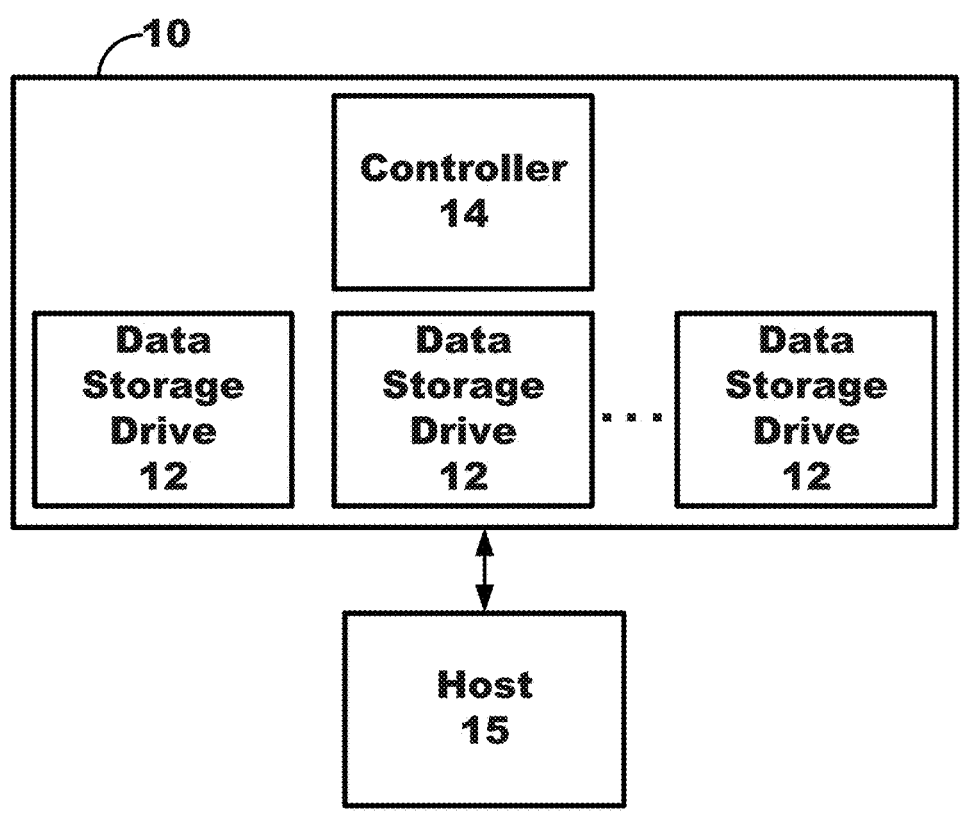
FIG. 1 is a block diagram including an exemplary system for use in reading and writing data from a plurality of data storage drives.

Exemplary systems, apparatus, and methods shall be described with reference to FIGS. 1-4. It will be apparent to one skilled in the art that elements or processes from one embodiment may be used in combination with elements or processes of the other embodiments, and that the possible embodiments of such systems, apparatus, and methods using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

Different applications (such as, e.g., cloud-based applications) and/or users may have different storage requirements. For example, some applications and some users may require a specific, or selected, input/output (IO) latency tolerance, IO jitter tolerance (e.g., jitters may be described as sudden changes in IO latency), and/or IO operations per second (IOPS) tolerance. Specifically, for instance, audio/video streaming applications and artificial intelligence applications may have stringent IO latency requirements while other applications such as, e.g., static text data of blogging sites, etc., may have higher levels of tolerance to relatively higher IO latency. Further, apart from IO latency requirements, cloud-based applications may have different levels of tolerance to jitters in IOPS.

Additionally, various types of storage mediums used in data storage drives may have various characteristics that may affect the performance of data retrieval and recordation. For example, solid-state drives (SSD) that include NAND memory blocks may wear over a period of time that may causes read performance degradation due to increased error rates, the errors of which may be correctable used error correction and decoding processes by a controller. These errors and subsequent correction may cause increased read latency and jitters in IOPs that can impact end-user experience in applications like video streaming, etc. which have significantly less levels of tolerance. This may be further complicated since the "wearing" of the NAND blocks may be uneven within the same SSD despite best efforts of "wear leveling" by SSD firmware. Further, as a drive starts to become "full" and a number of bad NAND blocks increase (e.g., due to "wear"), recycling overheads can cause increased write latency in the write data paths of a drive.

Further, for instance, in cloud datacenters, storage from a single enclosure and drive may often be assigned to different applications having different tolerance levels to storage IO latency. Manually matching storage to application based on IO latency (which, as described, may be dependent on NAND health) and IOPS jitter requirements may be a challenging and cumbersome process.

Still further, datacenter managers may have to track and ensure SSD NAND health and assign NAND-based storage to applications taking into consideration IO latency tolerance of applications. As noted earlier, storage that may be good enough for some applications may not be acceptable for other applications. Since both "good" and "bad" NAND blocks may exist within the same drive, simply assigning some NAND-based storage devices to particular applications may not be sufficient to provide the data retrieval and recordation performance that some applications may require.

The exemplary systems, apparatus, and methods described herein may be described as a solution where intelligence may automatically store data based on the merit, or health level, of data blocks (e.g., SSD NAND blocks) on a plurality of data storage drives, or devices, and the quality-of-service level (e.g., indicative of IO latency tolerance, etc.) of data desired by applications.

Further, the exemplary systems, apparatus, and methods may include an enclosure described as being "intelligent" and being capable of using an array of attached data storage drives such as, e.g., SSDs. The array of data storage drives may be referred to as non-redundant arrays of drives delivering quality-of-service (QoS). The data storage drives, or devices, attached to the enclosure may be described as operating in concurrently and providing QoS by matching application data having low latency requirements to relatively healthier data blocks within the data storage drives of the non-redundant arrays of drives and vice-versa.

In one or more embodiments, the exemplary systems, apparatus, and methods may perform the functionality described herein by stripping data across multiple data storage drives within a set based on the health levels of data blocks within the data storage drives. The health levels of the data blocks in attached data storage drives participating to form a set may be tracked, and a data may be directed data to a drive based on health levels of the data blocks within the drive, matching with an application's requirements of QoS (e.g., storage IO latency).

In other words, a plurality of data storage drives participating in a set may contribute their data blocks to create a pool of data blocks, and intelligent logic provided by the exemplary systems, apparatus, and methods may then match the application data with data blocks as per determined by the QoS level of the application data.

The exemplary systems, apparatus, and methods may be capable of saving costs in datacenters as useful life of drives can be extended even though quality of data blocks (e.g., NAND blocks) has deteriorated to meet IO latency of demanding applications as long as other data blocks can meet IO latency requirements of relatively lesser demanding applications. Further, the exemplary systems, apparatus, and methods may automatically assign data blocks to applications based on IO latency needs without human intervention. Additionally, the exemplary systems, apparatus, and methods may include sophisticated tools such that an administrator can get a view of application IOPs tolerance versus health of data blocks, which may aid decision making related to procurement of data storage drives.

An exemplary system, or device, 10 (e.g., data storage device) that can be used in the embodiments described herein are depicted in FIG. 1. The exemplary system 10 may be operably coupled to a host 15, e.g., for transferring data therebetween. For example, the host 15 may request data from the system 10, and in turn, the system 10 may provide such requested data to the host 15. In at least one embodiment, the host 15 is a computer (such as, e.g., a personal computer, server, etc.). Although a single host device is depicted, it is to be understood a plurality of host devices 15 may be operably coupled to the system 10.

As shown, the system 10 includes a plurality data storage drives 12 for storing data. The data storage drives 12 may include any device and/or apparatus configured to store data (e.g., binary data, etc.). The data storage drives 12 may include one or more storage mediums that can include, but is not necessarily limited to, solid state memory, hard magnetic discs, magnetic tapes, optical discs, integrated circuits, volatile memory, nonvolatile memory, and any combination thereof. Each of the data storage drives 12 may include the same type or a different type of storage mediums. For example, each of the data storage drives 12 may include solid-state memory. In other words, each of the data storage drives 12 may be solid-state drives (SSD). In another example, some of the data storage drives 12 may include solid-state memory and some of the data storage drives 12 may include hard magnetic discs.

Figure 2:
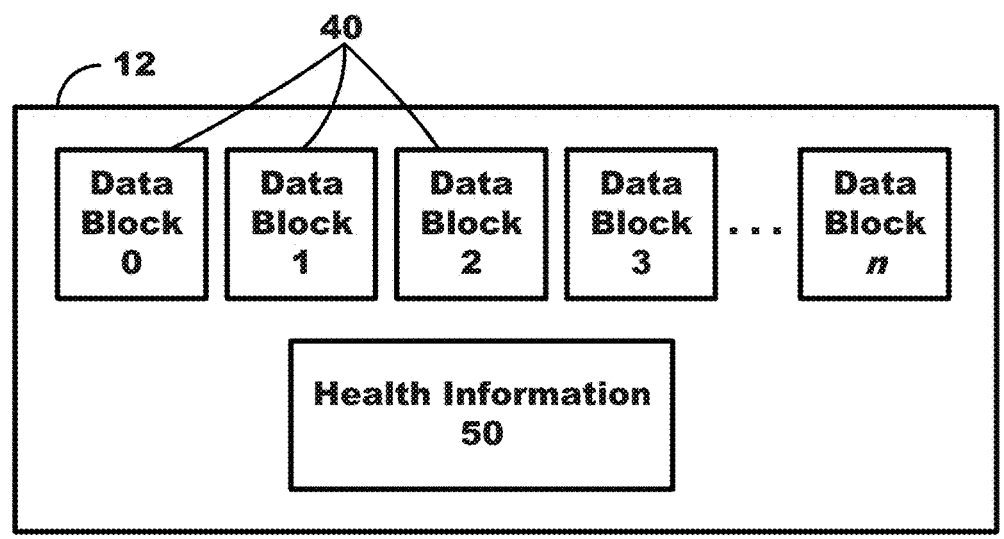
FIG. 2 a block diagram of an exemplary data storage drive of the system of FIG. 1.

As shown in FIG. 2, each of the data storage drives 12 may include any devices, circuits, and/or apparatus configured to store a plurality of data blocks 40. In at least one embodiment, each data block 40 may be referred to as a "sector." Generally, the plurality of data blocks 40 may be contained in non-volatile data storage. Non-volatile data storage may include any kind of computer memory that can retain information stored thereon when not powered. Examples of non-volatile memory that may be utilized as the non-volatile main memory include, but are not limited to, read only memory (ROM), flash memory, hard drives, and random-access memory (RAM). Examples of ROM include, but are not limited to, programmable ROM (PROM) which can also be referred to as field programmable ROM; electrically erasable programmable ROM (EEPROM) which is also referred to as electrically alterable ROM (EAROM); and erasable programmable ROM (EPROM). Examples of RAM include, but are not limited to, ferroelectric RAM (FeRAM or FRAM); magnetoresistive RAM (MRAM); resistive RAM (RRAM); non-volatile static RAM (nvS-RAM); battery backed static RAM (BBSRAM); phase change memory (PCM) which is also referred to as PRAM, PCRAM and C-RAM; programmable metallization cell (PMC) which is also referred to as conductive-bridging RAM or CBRAM; nano-RAM (NRAM), spin torque transfer RAM (STTRAM) which is also referred to as STRAM; and Silicon-Oxide-Nitride-Oxide-Silicon (SONOS), which is similar to flash RAM.

The system 10 further includes a controller 14 operably coupled to the plurality of data storage drives 12 and may include various circuitry, logic, memory, etc. for use in reading, writing, moving, erasing, etc. data from the plurality of data storage drives 12. For example, the controller 14 may include one or more circuit components such as integrated circuits, processors, etc. that may be configured to interface with the plurality of data storage drives 12 to read (e.g., including decoding) and write data therein. Further, as described further herein, the controller 14 may be configured to maintain health information for the plurality of data storage drives 12 such that, for example, the controller 14 may store data having particular QoS levels into data blocks 40 of the plurality of data storage drives 12 that has a health level that corresponds to the particular QoS levels. Still further, the controller 14 may query the plurality of data storage drives 12 to obtain health information regarding each of the plurality of data storage drives 12 such as an amount of available data blocks 40 at each health level that are remaining on each data storage drive 12. Yet, still further, the controller 14 may facilitate the movement of data among the plurality of data storage drives 12 to maintain data having particular QoS levels being stored on data blocks 40 of the plurality of data storage drives 12 that has a health level that corresponds to the particular QoS levels.

The methods, techniques, and/or processes described in this disclosure, including those attributed to the controller 14 of the system 10 and the controllers of the data storage drives 12, each of which may include one or more processors, or various constituent components, may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "controller," "processing apparatus," "processor," or "processing circuitry" may generally refer to any of the foregoing logic circuitry, alone or in combination with other logic circuitry, or any other equivalent circuitry.

Such hardware, software, and/or firmware may be implemented within the same apparatus or within separate apparatuses to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, apparatus, and techniques described in this disclosure may be embodied as instructions on a computer-readable medium such as RAM, ROM, NVRAM, EEPROM, FLASH memory, STRAM, RRAM, magnetic data storage media, optical data storage media, or the like. The instructions may be executed by one or more processors to support one or more aspects of the functionality described in this disclosure.

The system 10 may be described as being a data storage enclosure configured to be operably coupled to a plurality of data storage drives 12. The data storage drives 12 may be removably coupled to the data storage enclosure such that a user may remove one or more of the data storage drives 12 from the enclosure (when, e.g., a drive 12 fails). Further, in one or more embodiments, a user may install or remove one or more data storage drives 12 into the data storage enclosure without rebooting or power cycling the system 10. In other words, the data storage drives 12 may be "hot swapped" into and out of the system 10. In at least one embodiment, the data storage enclosure is a rack-mountable enclosure that is configured to be used in a datacenter among servers and other similar enclosures. Further, the data storage enclosure may include many components that are outside the scope of the disclosure but may still be contemplated herein such as, for example, a power supply, cooling apparatus, networking apparatus, etc.

As described herein, each exemplary data storage drive 12 may include data blocks 40 (e.g., Data Block 0, Data Block 1, Data Block 2, Data Block 3, Data Block 4 . . . ) to store data thereon. Further, each exemplary data storage drive 12 may further include health information 50 for each of the blocks 40. The health information 50 of the data storage drives 12 may be described as information related to the capabilities, or at least suspected capabilities, of each of the data blocks 40 being used to read or write data therefrom. The health information 50 may be based on the frequency that data has been written to and/or read from each of the data blocks 40 (which, e.g., may increase wear of the data blocks), historical use of the data blocks 40 such as whether the data storage drive 12 has previously needed to conduct various error correction when retrieving data from the data blocks 40, etc. Such health information 50 may include any information that may be indicative of the input/output latency tolerance, input/output jitter tolerance, and input/output operations per second (IOPS) of the data blocks 40.

In at least one embodiment, the health information 50 may further compact, or simplify, the health information of data storage drive 12 into a level, or classification, of each of the data blocks 40 along a range of levels. In other words, the health information 50 may include a health level, or grade, for each of the data blocks 40. The health levels may range from a minimum health level to a maximum health level, the maximum health level having, or defining, a lower input/output latency tolerance and/or a lower input/output latency tolerance than the minimum health level. Further, in at least one embodiment, the health information 50 may include a numerical health level for each of the data blocks 40 that may range between "0" and "3," with "0" corresponding to the best performing data block 40 and "3" corresponding to the worst performing data block 40.

The health information 50 may further include an amount, or count, of available data blocks 40 at each particular health level. In this way, if the controller 14 requests an amount, or count, of available data blocks 40 at each particular health level, the data storage drives 12 may efficiently provide such health information to the controller 14. Further, the data storage drives 12 may periodically analyze the data blocks 40 to classify, or reclassify, the health level of each of the data blocks 40.

Although not depicted in FIG. 2, it is to be understood that each of the data storage drives 12 may include a controller to be perform the various functionality and processes described herein. The controller of the data storage drives 12 may be similar to the controller 14 of the system 10, and thus, the description herein regarding the controller 14 of the system 10 may also describe the controller, or processing apparatus/circuitry, of the data storage drives 12.

In other words, the data storage drives 12 may periodically analyze their own data blocks and classify each block 40 at a specific level of health, maintain a count of data blocks 40 in each health level as per a fixed format, and respond to commands (e.g., vendor-specific commands), e.g., triggered by controller 14, for providing information regarding the number of data blocks 40 in each health level. Additionally, as described herein, the data storage drives 12 may store write data into data blocks 40 based upon the QoS level (e.g., IO latency and jitter tolerance) of application data. For example, the controller 14 may indicate the QoS level, or quality, of data being written using one or more various processes (e.g., vendor-specific write commands, tags in write command packet indicating the health level of data block in which data is to be stored, etc.), and the data storage drives 12 may store the data into the data blocks 40 having the corresponding health level. Further, the data storage drives 12 may store the health level of the data blocks 40 in which the data is actually stored into the heath information 50.

Additionally, although the data storage drives 12 may make a best effort to match the data to data blocks having health levels that correspond to the QoS levels of the data, the data may not be able to be written to corresponding data blocks 40 (e.g., if no data blocks having a corresponding health level remain available, etc.), and thus, the health level of the data blocks 40 in which the data is written may not match or correspond to the desired QoS, or health, level that the data defines. In this example, the data storage drives 12, may remember which data are not stored in data blocks having the appropriate health levels, and move the data at a later time. For example, the data storage drives 12 may maintains a "Health Level Change Notification Table" in the health information 50 that stores the logical block address (LBA) and "updated health levels" of data blocks in which LBA data is stored. In one or more embodiments, the controller 14 of the system 10 may be provide the entire or parts of "health level change notification Table" through various commands to and from the data storage drives 12.

Figure 3A:
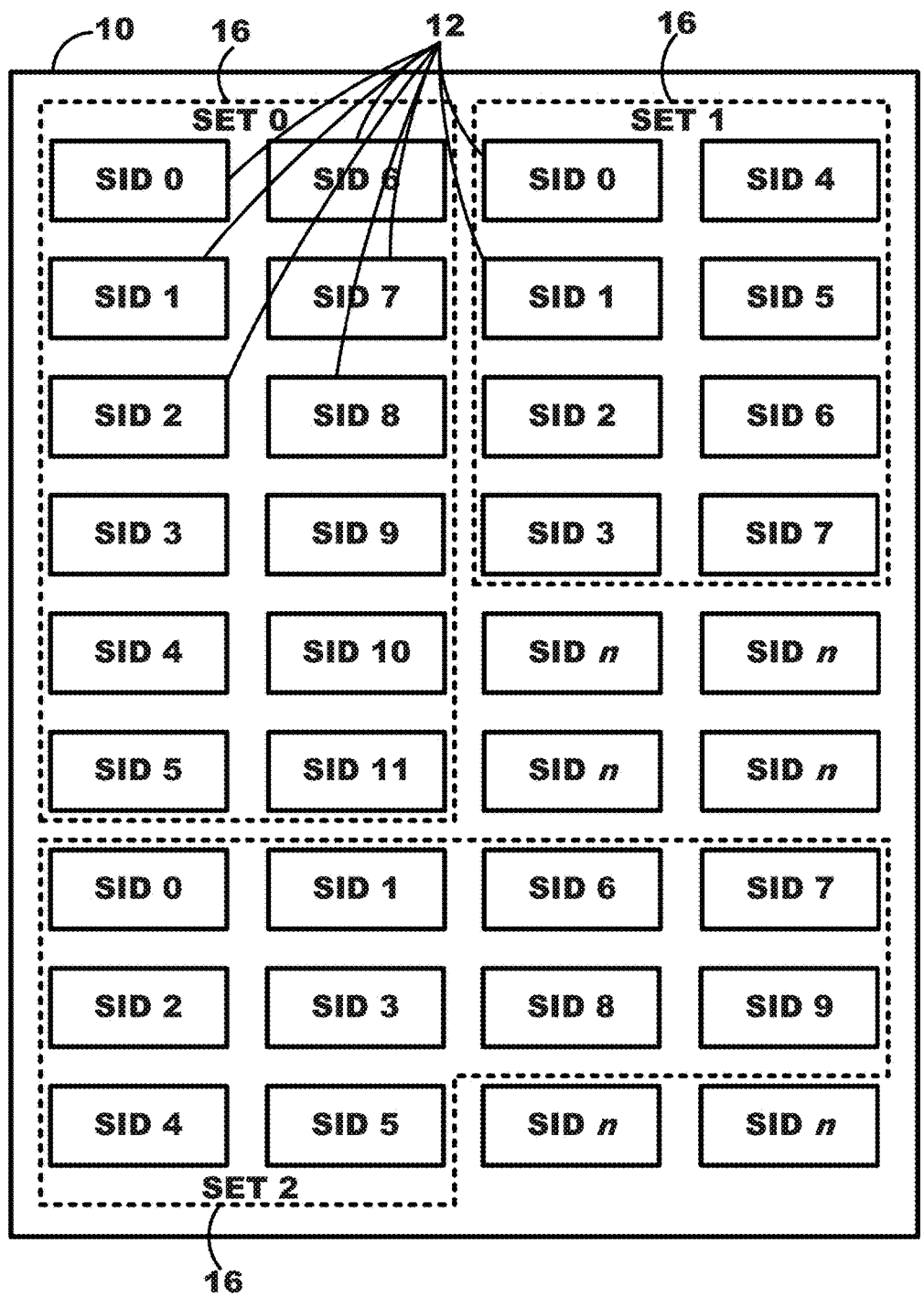
FIG. 3A is a block diagram of an exemplary system including a plurality of data storage drives arranged, or grouped, in a plurality of sets.
Figure 3B:
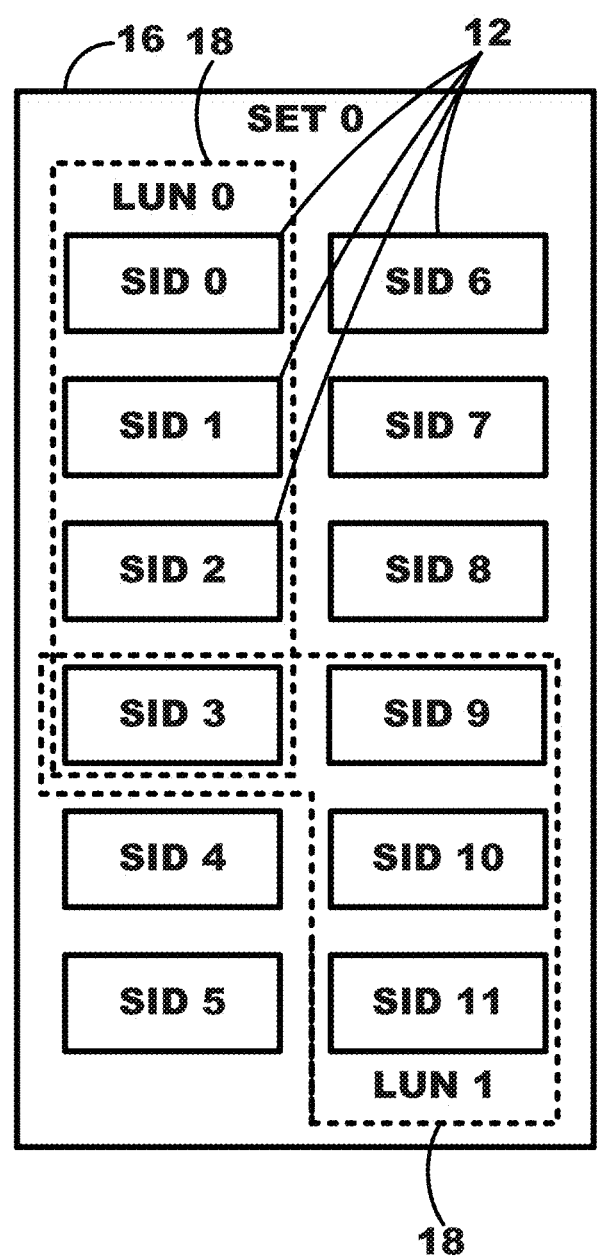
FIG. 3B is a block diagram of an exemplary set of data storage drives from the system of FIG. 3A defining two pools.

A block diagram of a plurality of data storage drives 12 arranged, or grouped, in a plurality of sets 16 of the system 10 is depicted in FIG. 3A, and a block diagram of an exemplary set 16 of data storage drives 12 from FIG. 3A defining two pools 18 is depicted in FIG. 3B.

As shown, the exemplary system 10 may include a plurality of data storage drives 12, and one or more of the data storage drives 12 may be arranged, or grouped, into one or more sets 16 (identified by the dashed lined outline). In this way, the system 10 may be described as being able to organize one or multiple attached data storage drives 12 into a single entity that can be logically viewed as single set 16. Further, one or more pools 18 may be formed within each of the sets 16. Such pools 18 may be identified by a logical unit number (LUN) as depicted, which may be logically viewed and identified as a single data storage entity. For example, no other devices or apparatus outside of the system 10 may know how many drives 12 make up, or define, each of the pools 18. Further, each of the data storage drives 12 within each pool 18 may be identified by a sibling ID (SID) as depicted, which may be used for mapping purposes as will be described herein. Still further as shown, it is to be understand that a single storage drive 12 may cater to one or more pools 18. For example, a single pool 18 may include storage space on more than one pool 18 such as, e.g., drive 12 "SID 3" which is part of both of pool 18 "LUN 1" and pool 18 "LUN 0."

Figure 4A:
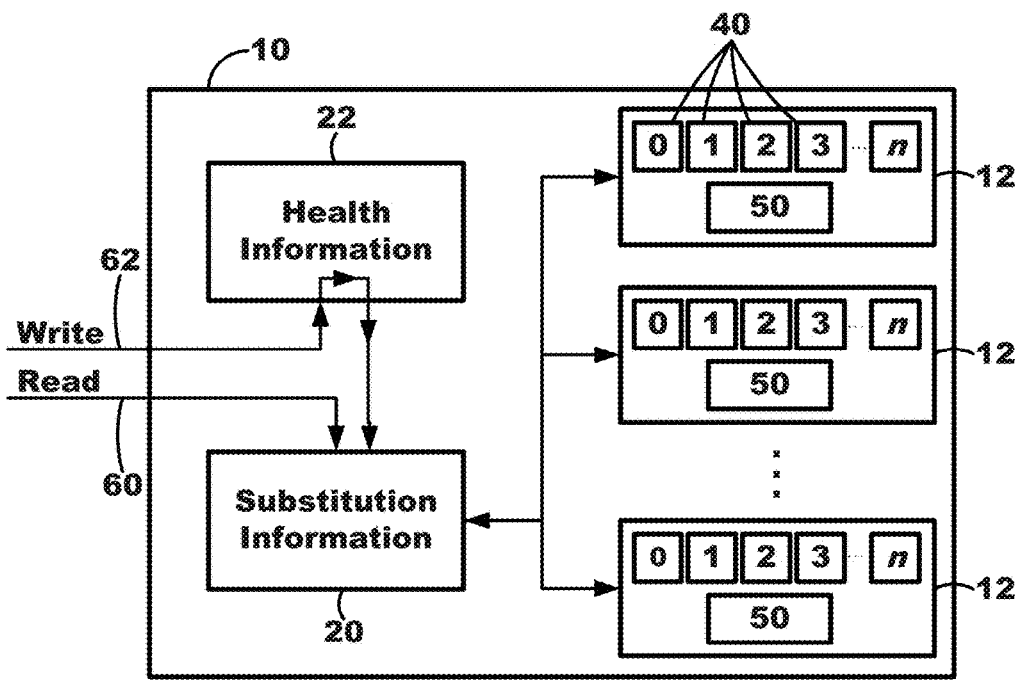
FIG. 4A is a functional block diagram of an exemplary system reading and writing data from a plurality of data storage drives.
Figure 4B:
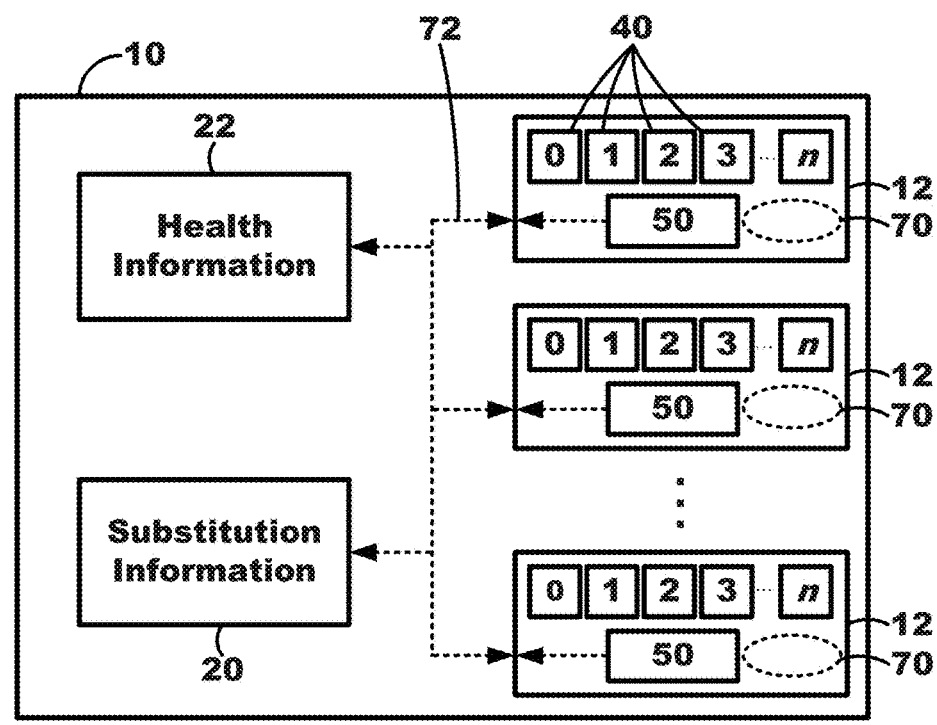
FIG. 4B is a functional block diagram of an exemplary system updating the health information for each of a plurality of data storage drives.

To map data within the system 10, the system 10 may further include and maintain substitute information 20 as shown in FIGS. 4A-4B. Generally, the substitution information 20 may be configured to map data from the end user's perspective to where the data is actually stored on the plurality of drives 12 to provide reading and writing the data. For example, the substitution information 20 may include a table that maps an end user LUN of a pool 18 and logical block address (LBA) to a corresponding SID of a data storage drive 12. Additionally, it is to be understood that the substitution information will be stored in persistent, non-volatile memory by the system 10, such that its contents remain same over reboots and power-cycles.

One exemplary substitution table may include following fields: logical unit number (LUN); logical block address (LBA); and sibling ID (SID). The SID may provide the sibling data storage drive identification to which a data block 40 identified by LUN+LBA combination is actually stored. Actual data can be retrieved/modified by using the SID+LBA combination. The SID will provide the sibling data storage drive ID in set 16 while LBA can be used to retrieve the actual data from data block(s) 40 of data storage drive 12 identified by the SID. Further, the substitution information 20 may further include a pool-to-set mapping table which gives the one or more sets 16 corresponding to a pool 18. This mapping table may be updated, e.g., during the creation of a pool 18.

In addition to the health information 50 stored on each of the drives 12, the system 10 may also include and maintain health information 22 as shown in FIGS. 4A-4B. Generally, the health information 22 may be for each of the plurality of data storage drives 12, and may include a number of available data blocks 40 at each health level for each data storage drive 12. Further, there may be a plurality of different health levels ranging from a minimum health level to a maximum health level. The maximum health level may define at least one of a lower input/output latency tolerance and a lower input/output jitter tolerance than the minimum health level. The health levels may be numerical values such as, e.g., 0 representing the best health level and 3 representing the worst health level.

As noted, the health information 22 may simply include the number of available data blocks at each health level for each data storage drive 12. In one example, the health information 22 may indicate that there are 1024 available data blocks 40 defining a health level of 0, 256 available data blocks 40 defining a health level of 1, 256 available data blocks 40 defining a health level of 2, and 64 available data blocks 40 defining a health level of 3 for a particular data storage device 12. In this way, the system 10 may always know how many data blocks 40 are each health level are available on each data storage drive 12 for the storage of data according the QoS levels of the data.

In other words, the health information 22 may include a table, which may be referred to as a "sibling health table," that gives the number of data blocks 40 at different health levels inside each sibling data storage device 12 of a set 16. The system 10 may include, or define, a table for each set 16 or for each pool 18. Additionally, as described herein, the system 10 may periodically query the sibling data storage drives 12 of each set 16 or pool 18 for its health information 50 to update the health information 22 of the system 10.

A read process 60 and a write process 62 are also depicted on the block diagram of the system 10 of FIG. 4A. The read process 60, which is represented by an arrowed, solid line, may begin with the reception of a read command by the system 10. The read command may include identification information for the portion, or extent, of data desired. For example, in one or more embodiments, the read command may include a pool identifier such as, e.g., a LUN, and a data address such as, e.g., a logical block address. The controller 14 (not depicted in FIG. 4A) may retrieve mapping information for the desired data from the substitution information 20 based on the identification information of the read command. For example, the pool identifier and the data address may be mapped to the data storage device identifier, and the data storage device identifier and the data address may then be used to return the requested data.

In other words, in response to a read data command, the system 10 may be described as "trapping" the data read command from the host, and "looking up" the substitution information with a LUN+LBA combination to determine a SID where the read data is resident. Using the SID and LBA, the data may be read from data storage device 12 and returned to the host.

The write process 62, which is represented by an arrowed, solid line, may begin with the reception of a write command including the data to be written by the system 10. The write command may further the quality-of-services (QoS) level for the write data. For example, in one or more embodiments, the write command may include a QoS level on a numerical scale ranging from 0 to 4 for the write data.

In other embodiments, the write command may not include a QoS level, and instead, the controller 14 may determine the QoS level for the write data based on the write data itself. For example, the controller 14 may determine that the write data is audio/video data, and since the data is audio/video data, then the write data desires a high QoS level (e.g., 0). Conversely, for example, the controller 14 may determine that the write data is static text data, and since the data is static text data, then the write data desires a low QoS level (e.g., 3).

The controller 14 (not depicted in FIG. 4A) may first consult, or review, the health information 22 for each of the sets 16 or pools 18 to determine if an amount of data blocks 40 defining, or having, a health level corresponding to the QoS level of the write data are available to store the write data. If there are not enough data blocks 40 defining, or having, a health level corresponding to the QoS level of the write data, the controller 14 may still send the write data to one or more data storage devices 12 including data blocks 40 defining a health level that is a close as possible to the health level corresponding the QoS level of the write data, and then flag the write data for movement to blocks 40 having the corresponding health level when possible at a later time. If there are enough data blocks 40 defining, or having, a health level corresponding to the QoS level of the write data, the controller 14 may send the write data to one or more data storage devices 12 having, or including, such health level-corresponding data blocks 40.

More specifically, the controller 14 may send at least the data to be written and the health level at which the data should be written at to the data storage drive 12. In essence, the data storage drive 12 may receive at least the write data and the health level of the blocks 40 where the data should be written. Once the data storage drive 12 writes, or stores, the write data, the data storage drive 12 may return acknowledgment and the data address where the data was written on the data storage device 12. The controller 14 may then enter, or write, the mapping information for the written data into the substitution information 20. For example, a pool identifier such as, e.g., a LUN, and a data address such as, e.g., a logical block address may be mapped to the data storage drive identifier such as, e.g., SID.

In other words, the system 10 may receive a write data command, "trap" the write data command from the host, and determine the QoS level that is to be rendered to the write data. This QoS level may be used to determine the health level of data blocks 40 into which the write data should be stored. As described herein, the system 10 may determine the QoS level by either receiving a QoS level from the write command or analyzing the write data to determine the QoS level. Then, a mapping table of the substitution information 20 may be "walked" to determine the set 16 corresponding to the pool 18, and a sibling data storage drive 12 that defines, or has, an adequate number of data blocks 40 at the determined health level (e.g., determined based on the QoS level of the write data), which may be determined by "walking" the health information 22. Then, a "vendor specific" write data command may be sent to the determined sibling data storage device 12 passing the LBA, the determined health level, and the data to be written into blocks 40 of the data storage drive 12. Upon acknowledgement of data storage from the sibling data storage drive 12, the substitution information 20 may be updated with the LUN, the LBA, and the SID, and the health information 22 may be updated with the health level of the blocks 40 at which the data is stored.

In other words, one or more processes on the firmware of the data storage drives 12 may implement a "vendor specific" command for write data that includes health level in addition to data address, number of blocks, etc. and the data storage drives 12 will try to store write data in data blocks 40 that are the same health level as requested by write command. In case the data storage drive 12 is not able to store the data in one or more data blocks 40 with a health level as indicated in the write command, the data storage drive 12 may store the data in one or more blocks 40 defining the next best health level. Then, the data storage drive 12 may inform the system 10 of the actual health level of the blocks 40 at which the data was stored in an acknowledge or similar-style response.

Further, after storing data, the data storage drive 12, in addition to updating the substitution information 20 with the data block address where data is stored, will also store the original health level requested by the write command in a field such as "requested health level." The "requested health level" field may be useful if the data was not stored in data blocks 40 having, or defining, a health level corresponding the QoS level for the data because, for example, if data blocks 40 become available defining the requested health level, the system 10 may move the data to the data blocks 40 defining the requested health level. Additionally, data blocks with "higher" health levels may be made available in a set by adding drives having "healthier" health levels.

Additionally, it may be described that upon reception of write commands, the system 10 will determine a QoS level of the write data. This determination may be based on host writing data, IO module port number, current mode of operation, etc. and any one or more processes may be used to determined, or generate, a QoS level for the data to be written. Upon the determination of QoS level, the system 10 may determine a corresponding health level, create a "vendor specific" write command, and convey the determined health level along with other information to the data storage drive 12. This health level may be sent to the firmware of the data storage drive 12, and then the firmware of the data storage drive 12 may complete the command and convey a success or failure message or command. In case of success, the actual health level of the data block 40 in which data is stored may be returned to controller 14 of the system 10 using status response of a write health command. Further, the actual health level may be stored in one or both of health information 22 and the substitution information 20 corresponding to the LBA.

As described herein, the system 10 may periodically move data from data blocks 40 that have decreased in health (e.g., "worn out") to healthier data blocks 40 and vice-versa to ensure that data from applications with high or low QoS needs (e.g., low or high IO latency tolerance) are stored in appropriately healthy data blocks 40. Such exemplary movement processes are depicted in FIG. 4B. As depicted, each of the plurality of data storage drives 12 may periodically monitor, or analyze, 70 (represented by a dashed line oval) its data blocks 40, and update the health information 50 for each of the data blocks.

The controller 14 (not depicted in FIG. 4B) may periodically retrieve health information 72 (represented by the dashed lines extending between the health information 22, substitution information 20, and the plurality of data storage drives 12) from the health information 50 of the data storage drives 12 to update the health information 22 of the system 10. Further, if data is stored in data blocks 40 that fall below the health level needed for the data, it may be moved to other data blocks 40 having, or defining, a health level corresponding to the QoS level of the data. In this way, the system 10 may maintain data in appropriate locations having health levels to provide matching, or corresponding, QoS levels for the data.

In other words, going forward, one or more health matching processes or logic in one or both of the controller 14 or the data storage drive 12 may periodically try to shift data that was not stored in data blocks 40 having the requested health level to data blocks 40 having health level originally requested by write commands. Further, in one or more embodiments, there may also be scenarios in which the data storage drive 12 may have to shift the data into data blocks 40 that have a lower health level or the health level of the data blocks 40 in which data is stored is reduced. In these examples, whenever there is a change in health level of data blocks 40 in which data is stored, the controller 14 and/or the data storage drive 12 may store the data address such as, e.g., LBA, and an updated health level in a health level change notification table in one or both health information 22, 50. Further, the data storage drive 12 may respond to a "vendor specific" read health level update commands that the system 10 may use to read entire or parts of the health information 50 of the data storage device 12. In one or more embodiments, the system 10 may be described as implementing a periodic logic or process named "health matching" that periodically walks the entries of the substitution information 20 and/or health information 22 and reads the health level change information to determine which data has been shifted to data blocks 40 of a different health level. Based on new health levels, the substitution information 20 and/or health information 22 for actual health level may be updated.

Further, for entries with mismatched determined health level and actual health level in the substitution information 20 and/or health information 22, fields, the health matching processes may check if any other data storage drives 12 in a set 16 or pool 18 has data blocks 40 with health level closest to the determined health level available. If yes, the data may be read from the existing data storage drive 12, moved to the newly identified data storage drive 12. and the substitution information 20 and/or health information 22 may be appropriately updated. Thus, the health matching processes 72 may try, or attempt, to ensure that heath level requirements of application data and data blocks 40 are closely matched.

Furthermore, pools 18 can be created on the basis of health status of data storage drives 12. For example, a plurality of pools 18 may be maintained along with health information for each of the plurality of data storage drives 12 of the pools 18. The health information, similar to as before, may include at least a number of available data blocks at each health level of a plurality of health levels for each data storage drive 12. Each of the pools 18, however, may be assigned a threshold value that represents a percentage of data blocks 40 per data storage drive 12 defining a selected health level that is allowed within the pool 18. Some pools 18 may have greater threshold values to, e.g., create pools 18 having greater health levels than other pools 18.

Data storage drives 12 may be moved from one pool 18 to another pool 18 based on the threshold values. For example, if the percentage of data blocks 40 on the data storage drive 12 defining the selected health level exceeds the threshold value of the pool 18 within which the data storage drive 12 resides, the exemplary system 10 may move the data storage drive 12 into a pool 18 that has capacity for a data storage drive 12 having the percentage of data blocks 40 of a particular health level below or above the threshold.

In other words, health information and pools 18 having particular thresholds may be used by the storage administrators to direct data to the data storage drives 12 according to the QoS (e.g., IOPS). The administrator can set the threshold for the pools 18, and data may be distributed, or stored, data storage drives 12 over the various pools 18 according to the data the system 10 receives. IO hungry applications may use more write access require data storage drives 12 having highest quality data blocks 40 with more lifespan. This, a threshold may be maintained for each pool 18, and whenever a data storage drive 12 may be allocated to that particular pool 18 exceeds the threshold, the data storage drive 12 can be automatically reassigned to another lesser IO hungry pool 18 and intimation can be sent accordingly.

For example, an exemplary system 10 may include 24 data storage drives 12, and out of which only 23 data storage drives 12 are used (e.g., with one data storage drive 12 being used as backup). The plurality of data storage drives 12 may be organized as 8 drives per a first pool 18, 8 drives per a second pool 18, and 7 drives per a third pool 18. Each of the first, second, and third pools 18 can be assigned with data storage drives 12 having "good," "better," and "best" quality data blocks 40, respectively. For instance, the first pool 18 may accommodate at most 50% of bad data blocks, the second pool 18 may accommodate at most 30% of bad data blocks, and the third pool 18 may accommodate at most 10% of bad data blocks.

Further, the threshold for the first pool 18 may be set as 48%, the threshold for the second pool 18 may be set as 28%, and the threshold for the third pool 18 may be set as 8%, each of which signifies an alert when the threshold is reached. If a data storage drive 12 in the third pool 18 has more than 8% of bad data blocks 40 (e.g., as data blocks "age" or "wear"), then that data storage drive 12 may be reassigned to either the first or second pools 18, since they can accommodate more drives with more bad data blocks 40 when compared to the third pool 18.

Then, the backup drive can be assigned to the third pool 18 and intimation can be sent to the administrator to add a new data storage drive 12 to the system 10 as backup since the backup drive is now used. Also, data storage drives 12 that exceeds threshold limit of the first pool, e.g., the lowest quality drive, may be removed from the system 10.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g., 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise. As used herein, "or" is generally employed in its sense including "and/or" unless the content clearly dictates otherwise. As used herein, "have," "having," "include," "including," "comprise," "comprising," or the like are used in their open-ended sense, and generally mean "including, but not limited to."

Embodiments of the systems, apparatus, and methods for phase slip recovery are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present disclosure is limited only by the claims that follow.

What is claimed is:

1. An apparatus comprising:
   a plurality of data storage drives, each data storage drive comprising a plurality of data blocks; and
   a controller comprising one or more processors, the controller operably coupled to the plurality of data storage drives and configured to:
     maintain health information for the plurality of data storage drives, the health information comprising a number of available data blocks at each health level of a plurality of health levels for each data storage drive,
     receive write data to be written to the plurality of data storage drives,
     determine a quality-of-service (QOS) level for the write data, and
     select one or more data storage drives for the write data to be written to based on the health information and the QOS level for the write data.

2. The apparatus of claim 1, wherein the plurality of health levels range from a minimum health level to a maximum health level, wherein the maximum health level defines at least one of a lower input/output latency tolerance and a lower input/output jitter tolerance than the minimum health level.

3. The apparatus of claim 1, wherein the system further comprises an enclosure to house the plurality of data storage drives and to removably operably couple the plurality of data storage drives to the controller.

4. The apparatus of claim 1, wherein selecting one or more data storage drives for the write data to be written to based on the health information and the QOS level for the write data comprises selecting one or more data storage drives comprising available data blocks defining a health level corresponding the determined QOS level.

5. The apparatus of claim 1, wherein all of the plurality of data storage drives comprises the same type of storage medium.

6. The apparatus of claim 1, wherein the plurality of data storage drives are solid-state drives.

7. The apparatus of claim 1, wherein the QOS level is representative of one or more of desired input/output latency tolerance, input/output jitter tolerance, and input/output operations per time period.

8. The apparatus of claim 1, wherein the controller is further configured to:
   maintain one or more pools, each pool comprising more than data storage drives; and
   maintain substitution information for each pool to map a pool identifier and a pool block address for a portion of data to a data storage drive identifier.

9. The apparatus of claim 1, wherein maintaining health information for the plurality of data storage drives comprises:
   updating the number of available data blocks at each health level for each of the plurality of data storage drives after writing the write data.

10. The apparatus of claim 1, wherein maintaining health information for the plurality of data storage drives comprises:
    querying the plurality of data storage drives to return the number of available data blocks at each health level for each of the plurality of data storage drives.

11. A system comprising:
    a plurality of data storage drives, each data storage drive comprising a plurality of data blocks; and
    a controller comprising one or more processors, the controller operably coupled to the plurality of data storage drives and configured to:
      maintain health information for the plurality of data storage drives, the health information comprising a number of available data blocks at each health level of a plurality of health levels for each data storage drive, and
      maintain data on the plurality of data blocks of the plurality of data storage drives defining a health level corresponding to a quality-of-service (QOS) level of the data.

12. The system of claim 11, wherein the plurality of health levels ranges from at least a minimum health level to a maximum health level, wherein the maximum health level defines at least one of a lower input/output latency tolerance and a lower input/output latency tolerance than the minimum health level.

13. The system of claim 11, wherein the system further comprises an enclosure to house the plurality of data storage drives and to removably operably couple the plurality of data storage drives to the controller.

14. The system of claim 11, wherein all of the plurality of data storage drives comprises the same type of storage medium.

15. The system of claim 11, wherein the plurality of data storage drives are solid-state drives.

16. The system of claim 11, wherein the QOS level is representative of one or more of desired input/output latency tolerance, input/output jitter tolerance, and input/output operations per second.

17. The system of claim 11, wherein maintaining health information for the plurality of data storage drives comprises:

querying the plurality of data storage drives to return the number of available data blocks at each health level for each of the plurality of data storage drives.

18. The system of claim 11, wherein maintaining data on the plurality of data blocks of the plurality of data storage drives defining a health level corresponding to a QOS level of the data comprises moving data to different data blocks in response to the health level of the data blocks upon which the data is stored changing to a health level that does not correspond to the QOS level of the data.

19. A system comprising:
   a plurality of data storage drives, each data storage drive comprising a plurality of data blocks; and
   a controller comprising one or more processors, the controller operably coupled to the plurality of data storage drives and configured to:
      maintain a plurality of pools, each pool comprising at least one data storage drive of the plurality of data storage drives,
      maintain health information for each of the plurality of data storage drives, the health information comprising a number of available data blocks at each health level of a plurality of health levels for each data storage drive, and
      assign a different threshold value for each pool, the threshold value representing a percentage of data blocks per data storage drive defining a selected health level allowed within the corresponding pool.

20. The system of claim 19, wherein the controller is further configured to move a data storage drive from a first pool to a second pool of the plurality of pools if the percentage of data blocks on the data storage drive defining the selected health level exceeds the threshold value of the first pool.

* * * * *